United States Patent [19]

Wheeler et al.

[11] 4,133,695
[45] Jan. 9, 1979

[54] PIGMENT COMPOSITION

[75] Inventors: Ian R. Wheeler, Houston; George H. Robertson, Paisley, both of Scotland

[73] Assignee: Ciba-Geigy Corporation, Ardsley, N.Y.

[21] Appl. No.: 865,064

[22] Filed: Dec. 27, 1977

[30] Foreign Application Priority Data

Jan. 6, 1977 [GB] United Kingdom .................. 338/77

[51] Int. Cl.² ................................................ C08K 5/34
[52] U.S. Cl. ........................... 106/288 Q; 106/308 N; 106/309; 260/314.5
[58] Field of Search ............... 106/288 Q, 308 N, 309, 106/308 S; 260/314.5

[56] References Cited

U.S. PATENT DOCUMENTS

| 2,315,870 | 4/1943 | Nadler et al. ...................... 260/314.5 |
| 3,754,958 | 8/1973 | Giambalvo ....................... 106/288 Q |
| 3,973,981 | 8/1976 | Miyatake et al. ................ 106/288 Q |
| 4,055,440 | 10/1977 | Wheeler et al. ................. 106/288 Q |

FOREIGN PATENT DOCUMENTS 1376247 12/1974 United Kingdom.

*Primary Examiner*—Helen McCarthy
*Attorney, Agent, or Firm*—Vincent J. Cavalieri; Joseph F. DiPrima

[57] ABSTRACT

A phthalocyanine pigment composition comprising a phthalocyanine pigment and a sulphonated phthalocyanine derivative of the formula

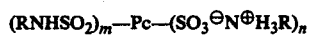

wherein the sum of m and n is 1 to 4 and R is a tertiary alkyl having 18 to 22 carbon atoms, which composition gives very good flow and strength when incorporated into paint and ink application media.

6 Claims, No Drawings

PIGMENT COMPOSITION

The present invention relates to pigment compositions containing a phthalocyanine pigment.

In the British Pat. No. 1,263,684 there is described a solvent treatment of a metal phthalocyanine pigment to which is added a copper phthalocyanine containing sulphonamide groupings formed from a sulphonated phthalocyanine and a primary or secondary amine.

The U.S. Pat. No. 4,055,440 describes phthalocyanine pigment compositions comprising a phthalocyanine pigment and a sulphonated phthalocyanine derivative formed from a sulphonated phthalocyanine dyestuff and dehydroabietylamine.

According to the present invention there is provided a phthalocyanine pigment composition comprising a phthalocyanine pigment and a sulphonated phthalocyanine derivative of the formula:

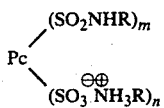

wherein n is from 1 to 4, m is 0 to 3, the sum of m and n being from 1 to 4, both n and m representing the average number of groups per phthalocyanine nucleus in a given sample, and R is the alkyl residue of a primary amine having the general formula:

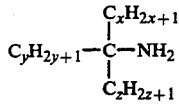

in which x, y and z are integers the sum of which is from 17 to 21.

A commercially available mixture of primary amines having the general formula II is that sold by Rohm and Haas under the Trade Name Primene JM - T.

The phthalocyanine derivative of formula I may be metal free, or it may be a zinc, copper, cobalt, nickel or other transition metal phthalocyanine and may contain halogen, especially chlorine, in the phthalocyanine molecule. Halogen free copper phthalocyanine dyestuffs are preferred.

While n can be from 1 to 4 and m can be from 0 to 3, those compounds of formula I are preferred in which n is 1 - 2.5 and m is 0 - 3.

The sulphonated phthalocyanine derivative of formula I may be produced, for example, (a) by reacting a sulphonated copper phthalocyanine having the formula

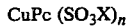

where n has its previous significance and X represents hydrogen, $NH_4+$, or an alkali metal such as sodium, potassium or lithium with n moles of a mixture of amines of formula II to substantially neutralise the free sulphonic acid groups.

(b) by reacting a sulphonated copper phthalocyanine having the formula

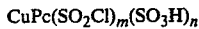

where m + n is 1 to 4, with m + n moles of a mixture of amines of formula II to substantially neutralise the sulphonic acid groups and react with the sulphonyl chloride groups to form sulphonamide.

The sulphonated phthalocyanine-amine derivative may be prepared in aqueous solution or it may be prepared in a suitable solvent and recovered by precipitation, e.g. with water, or by removal of the solvent by distillation, optionally with the addition of water. Among suitable solvents there may be mentioned acetone, ethylmethylketone, ethanol and methanol, but isopropanol is particularly preferred.

The phthalocyanine pigment may be metal free or it may be a zinc, copper, nickel or other transition metal phthalocyanine, and may contain up to 50% by weight of chlorine. The preferred pigment is a copper phthalocyanine, which may be in either the alpha or beta crystalline form, or a mixture of the two, and may or may not contain peripherally bound chlorine atoms.

The ratio of phthalocyanine pigment to sulphonated copper phthalocyanine derivative of formula I may be from 70:30 to 99:1 by weight, but preferably from 90:10 to 95:5.

The sulphonated phthalocyanine derivative may be incorporated into the pigment at various stages in the preparation, treatment or use of the pigment. When produced by method (a) it can be added to an aqueous slurry of the pigment but is especially effective if added during treatment of the pigment with solvent, such as the solvent treatment described and claimed in British Patent Specification No. 1,140,836. In this case the sulphonated derivative may be preformed and then added as a powder, press-cake, slurry or solution, or it may be formed in the presence of the relevant pigment.

When produced by method (b) the sulphonated derivative can be formed during solvent treatment but is preferably preformed and added during the solvent treatment.

Alternatively the preformed sulphonated derivative, when produced by any of the methods (a), and (b), may be added during milling of the pigment in an application system, for example, in a bead mill, or it may be simply mixed with the pigment powder before use. The preformed sulphonated derivative may also be added during milling of the crude pigment in the presence of a crystallising solvent.

The use of the primary amines of formula II to form the sulphonated derivatives impart better flow and strength to systems when compared with the use of other primary amines such as octadecylamine, octadecenylamine, eicosanylamine and docosanylamine. These improved properties are shown when the compositions are incorporated into paint and ink application media. Especially important paints are the largely hydrocarbon solvent oil based decorative and industrial types such as air drying alkyd, melamine formaldehyde cured alkyds and thermosetting acrylics. Important ink applications are the nitrocellulose and polyamide binders in largely oxygenated solvents and the hydrocarbon solvent based publication gravure inks with for example modified rosin binders. The improved rheological properties in ink and paint systems may be utilised to produce dispersions via conventional grinding and high speed stirring techniques at higher pigment loadings. This is advantageous in terms of utilisation of the milling equipment, that is, throughput of the ink or paint being manufactured.

The pigment compositions of the invention readily form fluid dispersions when milled into solvents alone, especially aromatic hydrocarbon solvents. Such dispersions may be used for pigmenting various media. These dispersions of pigment composition and solvent can be incorporated into decorative and industrial paints, nitrocellulose inks, and in particular, toluene based publication gravure inks, by any of the commonly used methods. However as the dispersion is already finely divided only low energy techniques are necessary at this stage of incorporation of the dispersion into the medium.

The invention is illustrated by the following Examples in which parts and percentages are expressed by weight unless otherwise stated. Parts by weight bear the same relationship to parts by volume as do kilograms to liters.

EXAMPLE I

A. 98 parts of crude copper phthalocyanine and 750 parts chlorosulphonic acid were stirred for 30 mins. at room temperature, then heated to 110–113° C and maintained at this temperature for $5\frac{1}{2}$ hrs. The reaction products were poured into an agitated mixture of 800 parts water, 2000 parts ice and 180 parts sodium chloride, at such a rate that the temperature did not rise above 10° C. The resulting slurry was filtered and washed with a solution of 460 parts sodium chloride in 3600 parts cold water. The presscake was resuspended in 800 parts water containing 40 parts sodium chloride and a 0.5 M. Primene JM-T acetate solution, (prepared by heating together 116 parts Primene JM-T, 700 parts water and 23 parts glacial acetic acid), added evenly over 30 mins. The pH was raised to 8.5 with dilute sodium hydroxide solution and the mixture stirred for 1 hr. at 85° C. Sufficient concentrated hydrochloric acid was then added to clear any blue bleed, and the product filtered, washed salt free with water, and dried at 50–60° C, to yield 234 parts of a blue-green powder.

B. 175 parts of crude copper phthalocyanine were ground in a vibratory mill with 23 parts of inorganic salts, 1.6 parts diethyl aniline and 0.8 parts glycerol mono-oleate until the phthalocyanine was of pigmentary sized crystals.

103 parts of this mixture, corresponding to 90 parts of copper phthalocyanine, were added to 600 parts of isopropanol and heated under reflux conditions with good agitation for $5\int$ hrs. 10 parts of the product of part A. of this example were then added and reflux continued. 30 mins. later 600 parts of water were added and the isopropanol removed by distillation. Agitation was stopped and the pigment composition filtered from clear liquors, washed salt free to neutral pH, and dried at 50–60° C, yielding 98.7 parts of a blue powder. The product was then incorporated into a toluene-phenolic ink publication gravure ink by the following procedure.

To a ball mill were charged.

| | |
|---|---|
| Phenolic varnish* | 96 parts |
| toluene | 40 parts |
| products of this example | 24 parts |
| 10mm steatite balls | 400 parts |

(*Phenolic varnish consisted of equal parts toluene and Alsynol RL30, a modified phenolic resin, pentaerythritol esterified).

Milling was carried out for 16 hrs. then there were added to 100 parts of the millbase, with agitation, 90 parts of phenolic varnish and 60 parts toluene.

Thus was formed a publication gravure ink of 6% pigmentation at 1:5 pigment binder ratio. The results are given in Table I.

EXAMPLE 2

A. 20 parts of the compound of average formula CuPc (SO$_3$Na)$_2$, in presscake form, were stirred in 1200 parts of water and the pH adjusted to 5.0 with dilute sodium hydroxide solution. 19 parts of Primene JM-T, in the form of its 0.2M aqueous acetate solution, were added evenly over 30 mins. Stirring was continued for a further 30 mins., and the product isolated by filtration, washing and drying to yield 38.8 parts of a blue-green dyestuff-amine composition.

B. The procedure of Example I B was followed except that 10 parts of the products of Example 2 A replaced the 10 parts of Example I A. The product of Example 2 B was then incorporated into a publication gravure ink as for Example I B. The results are given in Table I.

EXAMPLE 3

100 parts of a pigmentary substantially α form copper phthalocyanine with 1.8% peripherally bound chlorine, as a 25% $^w$/w presscake, was dispersed by paddle stirring in 800 parts by volume of isopropanol and 100 parts water. 10 parts of the derivative of Example I A were then added and the mixture brought to reflux and held for 30 minutes with stirring. 1000 parts of water were then added and the isopropanol azeotrope distilled off. The resultant pigment composition was isolated by filtration washing with water and drying at 60° C.

A decorative paint stainer was prepared by charging to a ball mill, 16 parts of the product of this example, 32 parts Beckosol $^R$. P470, 31 parts white spirit, and 250 parts 10 mm steatite balls. The mill was sealed and milled 16 hrs. Then there were added 40 parts P470, milled for 30 mins, followed by 37 parts P470 and 3.8 parts driers solution. The mixture was milled a further 30 mins and the resulting mobile dispersion discharged.

7 parts of this stainer were added with good stirring to 70 parts of a white paint of the following composition:

| | |
|---|---|
| Tio$_2$ (Tioxide R-CR2$^R$) | 25% |
| Beckosol $^R$. P470 | 56.7% |
| White Spirit | 16.3% |
| Driers Solution | 2% |

Beckosol P470 is a soya long oil alkyd, 70% $^w$/w in white spirit. The final paint was then brushed onto white cards and the results are given in Table 2.

This product was also tested in an industrial paint based on a coconut oil alkyd-melamine formaldehyde binder and the strength of the paints were again assessed by reduction into a white base. The results were given in Table 3.

EXAMPLE 4

100 parts of the same α copper phthalocyanine pigments as used in Example 3 was slurried up again as in Example 3. To this dispersion there was added 5 parts of a compound of the formula CuPc(SO$_3$H)$_2$ and the mixture stirred for 15 minutes. An aqueous solution of Primene JM-T prepared by heating 9.5 parts Primene JM-T, 280 parts water and 2.0 parts glacial acetic acid was then added to the pigment composition. This mixture was then brought to reflux and held at reflux with stirring for 30 minutes. The pigment composition was then isolated as for Example 3. The product was tested in a decorative and industrial paint according to Example 3. The results are given in Table 2 and 3 respectively.

EXAMPLE 5

190 parts of a substantially α-form copper phthalocyanine pigment containing 1.8% w/w peripherally bound chlorine, were added, as presscake, to 3000 parts water containing 10 parts of the compound of formula CuPc (SO$_3$H)$_2$. The mixture was high speed stirred for 1 hr, until a smooth dispersion was obtained. The pH was adjusted to 5 with dilute sodium hydroxide solution.

An aqueous solution of Primene JM-T prepared by heating together 9.5 parts Primene JM-T, 280 parts water and 2.0 parts glacial acetic acid, was run in evenly over 30 mins, with good stirring. The slurry was stirred for a further 30 mins, and the product filtered from clear liquors, washed salt free to neutral pH, and dried at 50–60° C, to yield 208.1 parts of a soft blue powder.

The sample was assessed as for that of Example 3 and the results are shown in Tables 2 and 3.

EXAMPLE 6

100 parts dry weight of the substantially α form copper phthalocyanine as used in Example 3 were dried at 60° C. To this was added 10 parts of the powder produced in Example 2 A and an even mixture produced by tumbling. The resultant composition was then assessed as the product of Example 3 and the results are shown in Tables 2 and 3.

EXAMPLE 7

The procedure of Example I B was repeated except that the product of Example I A was omitted. The resultant pigment was filtered, washed and dried and then intimately mixed with 10 parts of the product of Example I A. This composition was then tested in a toluene-phenolic publication gravure ink as Example I B. Results are given in Table I.

TABLE 1

| Assessment in toluene/phenolic publication gravure inks. | | | |
|---|---|---|---|
| Example | Colour strength | Flow [1] | Gloss |
| Control [2] | Control | 3%/30 secs. | Control |
| 1 | 20% strong | 92%/13 secs. | Superior |
| 2 | 20% strong | 90%/26 secs. | Superior |
| 7 | 0–5% strong | 12%/30 secs. | Similar |

[1] as assessed by % of ink discharged through a standard aperture in given time (secs).
[2] prepared according to the procedure of Example I B but omitting additive from Example I A.

TABLE 2

| Assessment in decorative alkyd paint. | | |
|---|---|---|
| Example | Colour strength | Flow[1] |
| Control [2] | Control | Just pourable |
| 3 | 25% strong | Fluid |
| 4 | 25% strong | Fluid |
| 5 | 20% strong | Fluid |
| 6 | 5% strong | Pourable |

[1] assessment of the mill base before reduction into white paint.
[2] product treated according to Example 3 but the additive omitted.

TABLE 3

| Assessment in alkyd/melamine-formaldehyde industrial paint. | | |
|---|---|---|
| Example | Colour strength | Flow [1] |
| Control [2] | Control | Fluid |
| 3 | 25% strong | Pourable |
| 4 | 25% strong | Pourable |
| 5 | 10% strong | Fluid |

TABLE 3-continued

| Assessment in alkyd/melamine-formaldehyde industrial paint. | | |
|---|---|---|
| Example | Colour strength | Flow [1] |
| 6 | 10% strong | Fluid |

[1] and [2] as for Table 2.

EXAMPLE 8

A. 49.5 parts of 4-sulpho phthalic acid, 54.6 parts urea, 7.1 parts cupric chloride, 0.2 parts molybdic oxide and 100 parts nitrobenzene were stirred together, heated slowly through 100° C and maintained at 180° C for 12 hrs. The nitrobenzene was removed by steam distillation at alkaline pH to yield a blue solution which was diluted to 1000 parts with water. 250 parts of this solution, corresponding to 11.2 parts solid, were adjusted to pH 5 by the addition of dilute hydrochloric acid. With stirring, 16.8 parts of Primene JM-T as its 0.1 molar aqueous acetate solution, were run in evenly over 30 mins. After stirring for a further 30 mins., the slurry was heated to 90° C, filtered from colourless liquors, washed salt free with water and dried at 55° C.

B. Crude copper phthalocyanine was ground to pigmentary size in a ball mill in the presence of a small quantity of inorganic salts. A quantity of this mixture containing 90 parts copper phthalocyanine was added to 700 parts of isopropanol-water azeotrope and refluxed for four hours. 10 parts of the product of part A of this example were added as a slurry in isopropanol, and reflux continued for 30 mins. 800 parts of water were then added and the isopropanol removed by distillation until the vapour temperature reached 86° C. The aqueous slurry was filtered, washed free of inorganic salts with warm water, and dried at 50–55° C, to yield 98.5 parts of pigment composition.

C. When incorporated in a long oil alkyd decorative paint system by shaking for 30 mins. on a 'Red Devil'$^R$ vibro-mill, the product of part B of this Example was considerably more fluid and 10% stronger than a corresponding paint containing a pigment prepared according to part B of this Example but without the addition of the dyestuff-amine composition.

EXAMPLE 9

A. 36 parts of crude copper phthalocyanine and 280 parts of chlorosulphonic acid were stirred together at 110–113° C for 3.5 hrs. After cooling, there were added 144 parts of thionyl chloride and the mixture heated to 90° C over 30 mins., and held at 90° C for 6 hrs., stirring throughout. After cooling, the slurry was poured slowly into a stirring mixture of 400 parts water, 1200 parts ice and 132 parts sodium chloride, keeping the temperature below 10° C throughout. The product recovered by filtration and washing with water had, by analysis, the approximate structure:

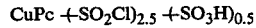

$$CuPc\ (\text{—}SO_2Cl)_{2.5}\ (\text{—}SO_3H)_{0.5}$$

45 parts of this compound, 34.6 parts Primene JM-T, 600 parts toluene and 13 parts sodium carbonate were stirred together at reflux for 18 hrs. 2500 parts water were added and the toluene removed by steam distillation. To the slurry there were added 17.3 parts Primene JM-T., in the form of its 0.1m aqueous acetate solution, and the mixture refluxed for 30 mins. thereby producing a blue-green powder having the average structure:

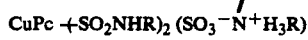

where R is the Primene JM-T residue.

B. 450 parts of isopropanol and 45 parts of pigmentary copper phthalocyanine in the form of the salt ground mixture of Example 8 were stirred together at reflux for 30 mins. 3.6 parts of the product of part A of this Example were added and reflux continued for 15 mins. 500 parts of water were run in and the isopropanol removed by distillation. 50 parts of a 1:1 mixture of water: concentrated hydrochloric acid were added, stirred 15 mins. and the pigment composition separated by filtration, washing with warm water and drying at 50–60° C.

C. A decorative alkyd paint prepared from the product of part B of this Example by the method of Example 3 was considerably more fluid and 15% stronger than a corresponding paint prepared according to part B of this Example but in the absence of the dyestuff-amine composition.

What we claim is:

1. A phthalocyanine pigment composition comprising a phthalocyanine pigment and a sulphonated phthalocyanine derivative of the formula:

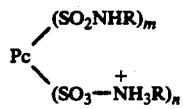   I wherein n is from 1 to 4, m is 0 to 3, the sum of m and n being from 1 to 4, both n and m representing the average number of groups per phthalocyanine nucleus in a given sample, and R is the alkyl residue of a primary amine having the general formula:

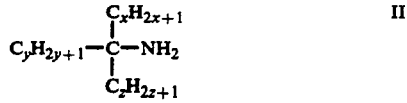   II in which x, y and z are integers the sum of which is from 17 to 21.

2. A phthalocyanine pigment composition as claimed in claim 1 in which the phthalocyanine derivative of formula I is a halogen free copper phthalocyanine dyestuff.

3. A phthalocyanine pigment composition as claimed in claim 1 in which in the compound of formula I, n is 1 to 2.5 and m is 0 to 3.

4. A phthalocyanine pigment composition as claimed in claim 1 in which the phthalocyanine pigment is an alpha or beta crystalline copper phthalocyanine or a mixture of the two.

5. A phthalocyanine pigment composition as claimed in claim 4 in which the copper phthalocyanine contains peripherally bound chlorine atoms.

6. A phthalocyanine pigment composition as claimed in claim 1 in which the sulphonated phthalocyanine is a copper phthalocyanine and the ratio of phthalocyanine pigment to sulphonated copper phthalocyanine derivative of formula I is from 90:10 to 95:5.

* * * * *